Aug. 1, 1961 W. E. MOTT 2,994,776
STABILIZED BOREHOLE LOGGING
Filed April 26, 1956 2 Sheets-Sheet 1

INVENTOR.
WILLIAM E. MOTT
BY
HIS ATTORNEY

Aug. 1, 1961  W. E. MOTT  2,994,776
STABILIZED BOREHOLE LOGGING

Filed April 26, 1956  2 Sheets-Sheet 2

INVENTOR.
WILLIAM E. MOTT
BY
HIS ATTORNEY

United States Patent Office 2,994,776
Patented Aug. 1, 1961

2,994,776
STABILIZED BOREHOLE LOGGING
William E. Mott, O'Hara Township, Allegheny County, Pa., assignor to Gulf Research & Development Company, Pittsburgh, Pa., a corporation of Delaware
Filed Apr. 26, 1956, Ser. No. 580,906
4 Claims. (Cl. 250—84.5)

This invention relates to new and useful improvements in method and apparatus for borehole logging, and pertains especially to a stabilized source of penetrating radiation of the type wherein ions are accelerated to strike a target containing nuclei that undergo a nuclear reaction with the accelerated ions to produce the desired radiation. In particular, this invention has to do with stabilizing the output of penetrating radiation.

The instant invention is related to the same general class of subject matter as that disclosed in two other similarly assigned applications of mine filed concurrently with this application, one of such other applications being U.S. Serial No. 580,834, filed April 26, 1956, and entitled "Logging Apparatus," and the other of such applications being U.S. Serial No. 580,833, filed April 26, 1956, and entitled "Borehole Logging."

Broadly, the subject invention comprises producing an electrical signal having a magnitude that is a function of the rate of the nuclear reaction taking place between bombarding ions and atomic nuclei included in the target, and controlling the rate at which ions are supplied from an ion source to an accelerator in a manner dependent upon the magnitude of the electrical signal, so as to achieve a substantially constant rate of nuclear reaction. Stabilization of the rate of nuclear reaction assures substantial stabilization of the output of penetrating radiation.

The invention also involves controlling the rate at which ions are supplied by the ion source to the accelerator in the manner above specified by alternatively varying the rate at which material to be ionized is introduced into the ion source, or varying the electrical potential applied to the electrodes of the ion source.

More specifically, the invention comprises effecting the previously mentioned electrical signal by using a radiation detector or radiation monitor sensitive alternatively either to the desired penetrating radiation produced by the nuclear reaction, or sensitive to some other form of radiation, such as alpha particles, that can be of penetrating character or of relatively short range character produced as a by-product, so to speak, of the nuclear reaction; and applying the output of the radiation monitor to means for effecting the electrical signal such as a counting rate meter or preferably an integrating network.

The invention will be better appreciated upon consideration of the following detailed description of preferred embodiments thereof accompanied by drawings illustrative thereof, wherein.

Figure 1:
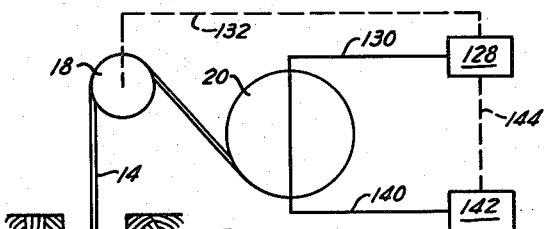
FIGURE 1 is a diagrammatic illustration showing the apparatus in position for use in a borehole.
Figure 2:
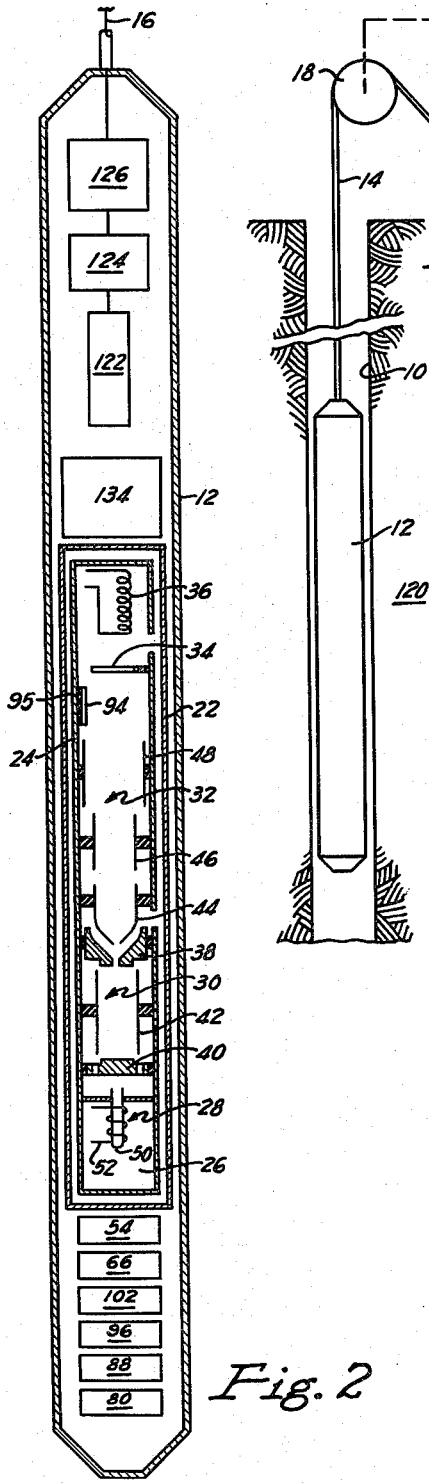
FIGURE 2 is a diagrammatic illustration of the interior of the logging probe.

Referring now to FIGURE 1, the reference numeral 10 designates a borehole in which a logging probe housing 12 is suspended for vertical movement therein upon a supporting cable 14 that includes electrical conduit means 16 therein (see FIGURE 2).

The cable 14 is entrained over a supporting pulley 18 and wound upon a reel 20. Means, not shown, of conventional character is provided for driving and braking the reel 20 so as to raise and lower the housing 12 within the borehole 10.

Contained within the housing 12 is a vacuum-tight casing 22, and resiliently supported by means not shown within the casing 22 is a hollow cylindrical glass container 24, which can be glass or metal, that is closed at its opposite ends as shown.

Disposed within the container 24 is a reservoir 26 for material to be ionized, valve means indicated generally at 28 for controlling the rate at which material to be ionized passes from the reservoir 26 into an ion source indicated generally at 30. The ion source 30 supplies ions to an accelerator indicated generally at 32 wherein such ions are accelerated to strike a target 34. Also disposed within the container 24 is an ionic pump 36 for maintaining the pressure within the accelerator 32 at a value on the order of $10^{-5}$ to $10^{-6}$ mm. Hg.

The structure thus far described is the same as that disclosed in my co-pending application entitled "Logging Apparatus," wherein the same is described in considerable detail. Sufficient for the purpose of this specification is to note that the ion source 30 comprises a pair of cathodes 38 and 40, and an anode 42; that the accelerator 32 comprises a probe electrode 44, and accelerating electrodes 46 and 48; and that the valve means 28 can be any type of electrically controllable valve suitable for regulating minute gaseous flow rates, though the preferred form of valve means comprises a palladium thimble 50 and an electrical heating element 52 therefor.

Figure 3:
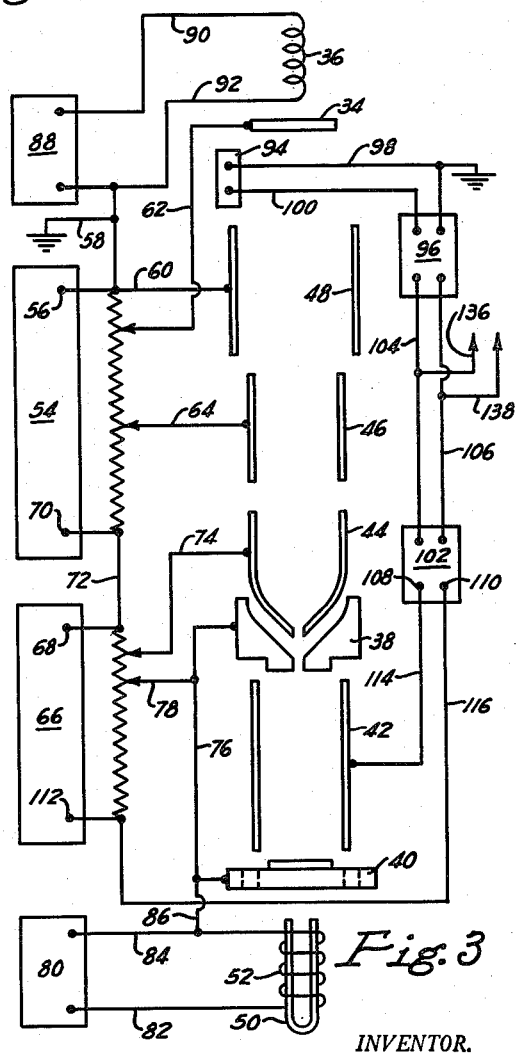
FIGURE 3 is a schematic illustration of the electrical circuitry associated with the radiation source shown in FIGURE 2.

Reference is now made to FIGURE 3 wherein the numeral 54 designates a high voltage supply that can conveniently be of the Van de Graaff or the Cockcroft-Walton type having a sufficiently high voltage output to accelerate ions to the energy necessary to cause the same to undergo the nuclear reaction productive of the penetrating radiation. The negative terminal 56 of the supply 54 is grounded as at 58 and connected to the electrode 48 by a lead 60. The target 34 and the electrode 46 are adjustably tapped to the positive side of the supply 54 by leads 62 and 64, as shown, the voltage of the target 34 being adjusted sufficiently positive with respect to that of the electrode 48 so that electrons formed at the target 34 do not pass to the electrode 48.

A further high voltage supply 66 for the ion source 30 is provided, and the negative terminal 68 thereof is connected to the positive terminal 70 of the supply 54 by a lead 72. The probe electrode 44 is adjustably tapped to the positive side of the supply 66 by a lead 74, and the cathodes 38 and 40 are adjustably tapped to the positive side of the supply 66 by leads 76 and 78.

The heat element 52 is energized by a source of electrical energy 80 connected thereto by leads 82 and 84, the latter lead being connected to the lead 76 by a lead 86.

The ionic pump 36 is supplied electrical energy from a source 88 thereof by leads 90 and 92, the latter lead being grounded as shown.

Radiation detector or monitor 94 shown in FIGURES 2 and 3 is disposed within the accelerator 32 and is mounted upon the inner surface of the container 24 by a material 95 preferably having a high dielectric constant at a position intermediate the accelerating electrode 48 and the target 34. The monitor 94, as clearly shown in FIGURE 2, is positioned substantially to one side of the central axis of the accelerator 32, so as not to obstruct the free path of ions bombarding the target 34. The monitor 94 is in sufficiently close proximity to the surface of the target 34 closest to the accelerator 32 so as to be subjected to both penetrating radiation and short-range radiation (notably alpha particles) emanating from the surface of the target 34 closest to the ion accelerator 32.

The monitor 94 is of conventional character and is selected to be such as to be sensitive substantially solely to radiation emanating from the target 34 that characterizes the nuclear reaction between ions bombarding the target 34 and atomic nuclei included in the target 34. Also, the monitor 34 is selected to be such as to produce an electrical pulse for each occurrence of detecting a quantum or particle of radiation from the target 34. For example, when the penetrating radiation produced by the target 34 is 14 mev. neutrons, such as by the bombarding ions being deutrons and the target 34 having tritium adsorbed on its surface adjacent the accelerator 32 (alternatively tritium ions and adsorbed deuterium, it being understood that "D–T neutron source" as used in the claims includes such alternative operation, the monitor 94 can be a conventional alpha proportional counter biased for substantially solely alpha response, it being noted that the nuclear reaction in this instance produces alpha particles as well as 14 mev. neutrons according to the equation $_1H^3(d,n)_2He^4$. It will, therefore, be apparent to those skilled in the art that the response of the monitor 94 will be proportional to the 14 mev. neutron output of the target 34, though in this instance the monitor 94 detects only alpha particles. It should also be observed that where the monitor 94 is sensitive solely to alpha particles, the response thereof to alpha particles originating anywhere other than at the target 34 is negligible or non-existent. It will, of course, be obvious to those skilled in the art in light of the preceding discussion that the monitor 94 can be such as to produce a response directly due to the penetrating radiation produced by the target 34, rather than the indirect arrangement hereinbefore described using the monitor sensitive solely to alpha particles. Though not preferred, it is feasible to employ a still more indirect method of obtaining a monitor response that is proportional to the output of penetrating radiation by the target 34. Such an alternative method can take the form of including a second type of atomic nuclei in the target 34 (other than that reactive to produce a desired penetrating radiation) which will also undergo a nuclear reaction with bombarding ions to produce alpha particles, in which event the monitor 94 will be of such character to be sensitive solely to alpha particles. Here again, the response of the monitor 94 will be directly proportional to the output of penetrating radiation from the target 34, as a consequence of the substantially fixed ratio of concentration of the two types of atomic nuclei included in the target 34.

Throughout this specification and in the claims, the expression "penetrating radiation" is meant to include both gamma rays and neutrons or a combination thereof. Accordingly, for example, should the type of bombarding ions and the atomic nuclei included in the target 34 be selected so that gamma rays are the produced form of penetrating radiation, it will be understood by those skilled in the art that the monitor 94 can be sensitive substantially solely to gamma rays, preferably substantially solely to gamma rays having energies that correspond to principal quanta of the nuclear reaction occurring in the target 34.

Where it is desired that the penetrating radiation be gamma rays, many combinations of types of bombarding ions and types of nuclei to be included in the target will occur to those skilled in the art. For example, the bombarding ions can be protons and the target include nuclei such as $_3Li^7$, $_9F^{19}$, $_6C^{12}$, or $_6C^{13}$. Higher accelerating potentials are required to cause gamma-ray producing reactions of these combinations than the previously mentioned neutron producing reactions. Accordingly, an appropriate selection of high voltage source for the accelerator must be made in view of the fact that for maximum yield protons must be accelerated by a potential on the order of about 450 kilovolts to react with $_3Li^7$ to produce 17 mev. gamma rays; 350 kilovolts to react with $_9F^{19}$ to produce 6 mev. gamma rays; 450 kilovolts to react with $_6C^{12}$ to produce 2 mev. gamma rays; and 560 kilovolts to react with $_6C^{13}$ to produce 8 mev. gamma rays; also, the target can include nuclei of $_3Be^9$ to produce gamma rays of various energies up to about 7 mev. where an accelerating potential of about 1 megavolt or better is available. Lesser accelerating potentials can be used in such combinations with reduced gamma-ray field.

The output of the monitor 94 is fed to an integrating network, or alternatively, a pulse height analyzer or discriminator combined with such a network or a counting rate meter 96 by leads 98 and 100. The function of the element 96 is to produce an electrical signal having a magnitude that is linear with respect to the rate at which pulses are received, thereby from monitor 94, and where the monitor 94 is of such character as to produce pulses having heights depending upon the energy of detected radiation and where the element 96 also includes a discriminator or pulse height analyzer the function of the element 96 is to produce an electrical signal having a magnitude that is linear with respect to the rate at which pulses are fed by the monitor 94 to the element 96 having a particular height or range of heights. The character of the element 96 will be readily comprehended by those skilled in the art in view of the preceding description of the function thereof.

The output of the element 96 is fed to a signal responsive device 102 by leads 104 and 106, the function of the device 102 being such as to vary the potential difference between a pair of terminals 108 and 110 in a manner dependent upon the magnitude of the signal effected by the element 96. More specifically, the function of the device 102 is to cause the terminal 110 to become increasingly more positive with respect to the terminal 108 upon the magnitude of the signal exceeding a predetermined value, and conversely, the function of the device 102 is to cause the terminal 108 to become increasingly more positive with respect to the terminal 110 upon the magnitude of the electrical signal becoming less than said predetermined value.

The device 102 can be a conventional servo system adapted to function as above specified wherein the output of the sensing element thereof is responsive to variations of an electrical signal or current in the leads 104 and 106 to control by means of an electric motor the electrical potential difference between the terminals 108 and 110. For example, though many other forms of servo systems or equivalents thereof will readily occur to those trained in this field, the current responsive device can be such as that illustrated in FIGURE 2 of U.S. Patent No. 2,735,943 issued February 21, 1956, to Wright et al., wherein the motor 72 thereof is arranged to drive a variable potentiometer controlling the potential difference between terminals 108 and 110. It will be understood that the device 102 also includes a conventional provision to isolate the high potentials of leads 114 and 116 from ground, such as an isolation transformer.

The terminals 108 and 110 are connected to the anode 42 and positive terminal 112 of the supply 66 by leads 114 and 116, respectively.

As thus far described, the operation will be easily understood. Whenever the output of penetrating radiation from the target 34 exceeds a value at which it is desired that the same be stabilized, such increase in output is sensed by the monitor 94 according to the principles hereinbefore described, and such increase is manifested through the element 96 effecting an electrical signal of a magnitude greater than the predetermined magnitude which is produced when the output of the target 34 is at the desired level. Upon the magnitude of the electrical signal exceeding said predetermined magnitude, the potential difference between the anode 42 and the cathodes 38 and 40 is caused to be progressively decreased with the result that the rate at which ions are supplied by the ion source 30 to the accelerator 32 is progressively decreased. Such decrease in the supply of ions is immediately reflected in a diminishing output of penetrating radiation by the target 34, whereupon the operation of the monitor 94, and the element 96, is such that the electrical signal decreases below the predetermined magnitude thereof, with the consequence of the device 102 causing the potential difference between the anode 42 and the cathodes 38 and 40 to increase with a corresponding increase in the output of the penetrating radiation by the target 34. In other words, the potential difference applied to the anode 42 and cathodes 38 and 40 is adjusted in the correct direction to remedy any variation of the output of penetrating radiation from the target 34. The time constants of the element 96 and device 102 are so selected as to avoid excessive "hunting" and preferably such as to quickly dampen the magnitude of potential adjustments applied to the ion source 30.

Referring again to FIGURE 2, it will be seen that means is provided for detecting radiation entering the borehole 10 from earth formations 120 (see FIGURE 1) surrounding the housing 12. Such means can be of such character as to detect any radiations entering the borehole 10 from the earth formations 120 resulting from any processes, however indirect, occurring within the earth formations 120 as a consequence of the latter being irradiated by penetrating radiation from the target 34. Normally, the radiation detecting means will be sensitive either to gamma rays or neutrons, or neutrons or gamma rays having a specific energy or range of energies; irrespective of the type of penetrating radiation produced by the target 34. Illustrative of one type of such means that can be employed is a combined scintillation phosphor sensitive to gamma rays and photomultiplier tube indicated at 122 the output of which is fed to an amplifier 124, with the output of the amplifier 124 being fed to a counting rate meter 126. The output of the counting rate meter 126 is fed to a recorder 128 by means of electrical conductors included in the electric conduit means 16 and a conventional pickup circuit 130 connected to the reel 20. The recorder 128 is of conventional character to record the output of the counting rate meter 126 vs. the depth of the housing 12 within the borehole 10 by means that includes an operative connection to the pulley 18 indicated in dashed lines at 132.

Shielding means 134 substantially opaque to the penetrating radiation of the target 34 is provided intermediate the target 34 and the radiation detector 122 for limiting insofar as practically feasible direct passage of penetrating radiation between such elements.

Means is provided for recording versus the depth of the housing 12 within the borehole 10 the magnitude of the electrical signal produced by the element 96 so that a check can be maintained upon the stability of the output of the target 34. Such means includes leads 136 and 138 connected respectively to the leads 104 and 106, electrical conductors included in the electric conduit means 16, a conventional pickup circuit 140 connected to the reel 20 and a recorder 142 that is operatively connected to the pulley 18 as indicated by dashed line 144.

Figure 4:
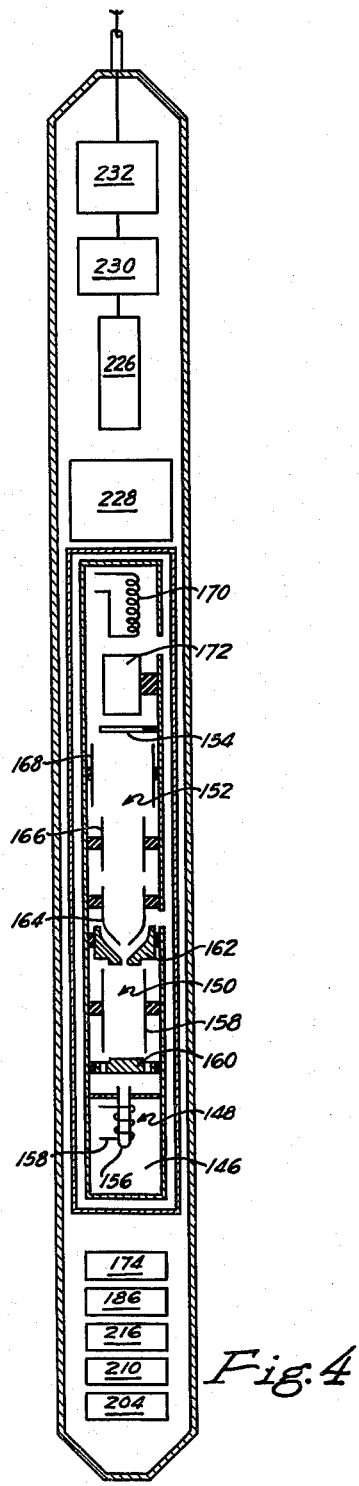
FIGURE 4 is a modification of the structure shown in FIGURE 2.
Figure 5:
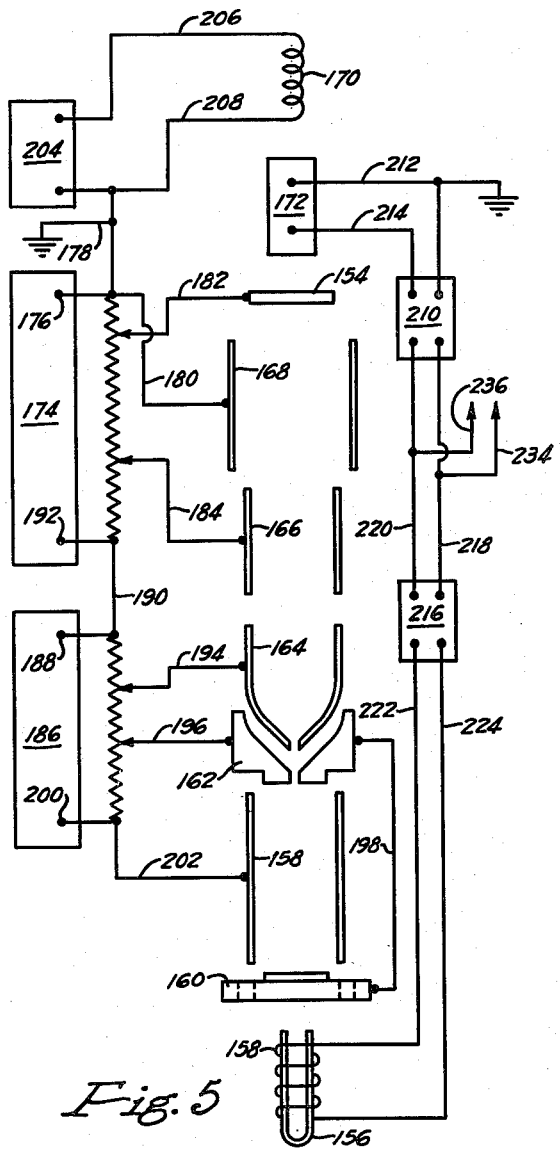
FIGURE 5 is a schematic representation of the electrical circuitry associated with the structure shown in FIGURE 4.

Proceeding now to consideration of the embodiment of the invention shown in FIGURES 4 and 5, it will be seen that the structure shown in FIGURE 4 is very similar with that shown in FIGURE 2, and comprises a reservoir 146 for material to be ionized, valve means indicated generally at 148 for introducing material to be ionized into an ion source indicated generally at 150, such ion source 150 supplying ions to an accelerator indicated generally at 152 for accelerating ions to strike a target generally at 154.

As previously explained in connection with the valve means 28, valve means 148 can be any electrically controllable valve means suitable for controlling minute gaseous flow rates, it being preferred, however, where the gas to be ionized is hydrogen or one of its isotopes that the same be a palladium thimble 156 and an electrical heating element 158 therefor as illustrated. In the claims, the expression "diffusion barrier" is meant to include equivalents for the illustrated palladium thimble 156 as described in my previously mentioned co-pending application entitled "Logging Apparatus." Generally speaking, such equivalence can be other physical configurations of the palladium, or the use of metals other than palladium such as tantalum that possesses the property of readily admitting diffusion of hydrogen gas and its isotypes therethrough that can be readily controlled by temperature.

The ion source 150 comprises an anode 158 and cathodes 160 and 162. The ion accelerator 152 comprises a probe electrode 164 and accelerating electrodes 166 and 168.

As in the previously described embodiment of the invention an ionic pump 170 is provided for maintaining a high vacuum within the accelerator 152. The operating pressure within the ion accelerator 152 will be on the order of $10^{-5}$ to $10^{-6}$ mm. Hg, a pressure substantially lower than that maintained within the ion source 150, namely, a pressure on the order of about $10^{-3}$ to $10^{-4}$ mm. Hg.

As thus far described, the embodiment of the invention shown in FIGURE 4 is identical to the embodiment of the invention shown in FIGURE 2. As in the case of the embodiment of the invention shown in FIGURE 2, a radiation monitor 172 is provided adjacent the target 154; however, in this instance the radiation monitor 172 is disposed on the side of the target 154 opposite the accelerator 152, and is preferably of a character possessing a directional sensitivity, with the axis of the preferential directions of sensitivity intersecting the center of the target 154. Also the radiation monitor 172 differs from the radiation monitor 94 in that while the latter can be selected so as to be sensitive to short range radiation, such as beta and alpha particles, as well as neutrons or gamma rays, the former preferably selected to be sensitive to either neutrons or gamma rays (usually neutrons or gamma rays according to whether the principal penetrating radiation produced by the target 154 is neutrons or gamma rays).

Exemplary of a wide choice of conventional radiation monitors suitable for use as radiation monitor 172 when it is desired that the latter be sensitive to neutrons is the proton-recoil counter, and when it is desired that the same be primarily sensitive to gamma rays, the same can be a Geiger counter or a NaI (TI) scintillation crystal and photomultiplier tube.

Attention is now directed to FIGURE 5 wherein there is illustrated schematically the electrical circuitry associated with the structure of FIGURE 4. The reference number 174 designates a high voltage supply that can be of the same nature as the previously described supply 54. The negative terminal 176 of the supply 174 is grounded as at 178, and is connected to the electrode 168 by a lead 180. The target 154 and the electrode 166 are adjustably tapped to the positive side of the supply 174 by leads 182 and 184, respectively, the target 154 being sufficiently more positive than the electrode 168 to prevent electrons emitted at the target 154 from reaching the electrode 168.

A further source of high voltage supply 186 is provided similar to the previously described supply 66, and the negative terminal 188 of the supply 186 is connected by a lead 190 to the positive terminal 192 of the supply 174. The probe electrode 164 and the cathode 162 are adjustably tapped to the positive side of the supply 166 by leads 194 and 196 respectively, with the cathode 162 being connected to the cathode 160 by a lead 198. The positive terminal 200 of the supply 186 is connected to the anode 158 by a lead 202.

The ionic pump 170 is energized from a supply of electrical energy 204 by electrical means 206 and 208, the latter of which is grounded as shown.

The output of the monitor 172 is fed to an element 210 of the same character as the previously described element 96 by leads 212 and 214. The electrical signal effected by the element 210 is fed to a signal responsive device 216 by leads 218 and 220. The function of the device 216 is to control the rate at which electrical energy is supplied to the heater element 158 by leads 222 and 224 in such a manner that whenever the magnitude of the signal effected by the element 210 exceeds a predetermined magnitude, energy is supplied to the heater element 158 at a decreased rate, and conversely, whenever the electrical signal effected by the element 210 falls below said predetermined magnitude, the energy supplied to the electrical heating element 158 is increased.

The device 216 can be a conventional servo system adapted to function as above specified wherein the output of the sensing element thereof is responsive to variations of an electrical signal or current to control by means of an electric motor the supply of electrical energy to the heating element 158 of the thimble 156. For example, though many other forms of servo systems or equivalents thereof will readily occur to those trained in this field, the device 216 can be of a character shown in FIGURE 2 of the previously mentioned patent with the motor 72 thereof controlling a variable rheostat.

The operation of the embodiment of the invention illustrated in FIGURES 4 and 5 will be easily understood. The radiation monitor 172 senses the output of penetrating radiation of the target 154, with the output being manifested by the magnitude of the signal effected by the element 210, such magnitude varying linearly with the output of the target 154. The magnitude of the electrical signal will have a fixed value whenever the output of penetrating radiation of the target 154 is at the desired value. An increase in the output of the target 154 is manifested by the electrical signal having a magnitude greater than said predetermined magnitude so that the device 216 decreases the rate at which electrical energy is supplied to the heater element 158 with a consequent decrease in the rate at which material to be ionized is introduced by the valve means 148 into the ion source 150. Upon such decrease in the rate at which material to be ionized is introduced into the ion source 150, the rate at which ions are supplied by the ion source 150 to the accelerator 152 is decreased with a consequent decrease in the output of the target 154. On the other hand, whenever the output of the target 154 falls below the desired level, the magnitude of the electrical signal falls below said predetermined magnitude, whereupon the rate at which electrical energy is supplied to the heater element 158 is increased with consequent increase in the rate at which material to be ionized is introduced into the ion source 150. Such increase in the rate at which material is introduced into the ion source 150 results in an increased rate of supply of ions to the accelerator 152, and results in an increase in the output of the target 154. It will, therefore, be apparent that the rate at which material to be ionized is introduced into the ion source 150 is so regulated as to maintain the output of the target 154 substantially constant.

This embodiment of the invention likewise can include a radiation detector 226, appropriate shielding means 228 interposed between such detector and target 154, and appropriate circuit elements associated with the detector 226 for recording information concerning radiation detected thereby such as an amplifier 230 and a pulse height analyzer 232. It will be understood that the output of the pulse height analyzer 232 is fed to a recorder such as that indicated at 128 in FIGURE 1. Also, the magnitude of the electrical signal effected by the element 210 can be recorded by means that includes leads 234 and 236 connected to leads 218 and 220, respectively, coupled to the recorder 142 in lieu of the leads 136 and 138 of the previously described embodiment of the invention.

Means, not shown, of conventional character is provided with respect to each embodiment of the invention to supply electrical energy to the elements within the housing through the supporting cable.

The illustrated preferred embodiments of the invention are subject to numerous variations without departing from the scope of the invention. Exemplary of such changes would be the interchange of the monitors 94 and 172 in FIGURES 3 and 5. Also, it is within the scope of the invention that alternative principles of particle acceleration can be used, such as the well-known microwave particle acceleration techniques with suitable modification of the elements of the accelerator as will be clearly apparent to those skilled in the art. Still another modification encompassed in the spirit of the present invention, where pulsing of the target is desired is the provision of means for periodically interrupting the bombardment of the target 154 as can, for example, be accomplished by periodically stopping the flow of current in the lead 202 of FIGURE 5.

In addition, the embodiment of the invention shown in FIGURE 3 is subject to stabilization of the pressure within the ion source making the operation of the valve means 28 dependent upon the flow of current in the lead 114 according to the principles set forth in my previously mentioned co-pending application entitled "Logging Apparatus."

The preferred embodiments of the invention have been described in very considerable detail for the purpose of conveying a complete and full understanding of the principles of the invention therein involved, and accordingly, narrowness of scope of invention is not to be thereby inferred. Attention is directed to the appended claims for ascertainment of the actual scope of the invention.

I claim:

1. In borehole logging apparatus, an elongated housing adapted to be lowered in a borehole, a source of penetrating radiation and also a radiation detector disposed in the housing, said source of radiation comprising a target and means for producing and bombarding the target with accelerated ions, said target including atomic nuclei that undergo a nuclear reaction with the accelerated ions to produce the penetrating radiation, said means including an ion accelerator and an ion source for supplying ions to such accelerator; and means for stabilizing the output of the so-produced penetrating radiation comprising means that includes a radiation monitor disposed adjacent the target for effecting an electrical signal having a magnitude that is a function of the rate of said nuclear reaction, and electrical means controlling the rate at which the ion source provides ions to the accelerator in response to the magnitude of the electrical signal, said ion source having associated therewith a reservoir for material to be ionized together with means for introducing such material into the ion source from the reservoir at a controlled rate, said electrical means controlling the last-mentioned means thereby to control the rate at which ions are supplied by the ion source to the accelerator.

2. A source of penetrating radiation comprising an ion accelerator, a target positioned to be bombarded by ions accelerated by the accelerator, said target including atomic nuclei that undergo a nuclear reaction with bombarding ions to produce the penetrating radiation, an ion source for supplying ions to the accelerator, means for introducing a material to be ionized into the ion source at a controlled rate, and means for stabilizing the output of radiation so produced comprising radiation monitor means disposed adjacent the target for effecting an electrical signal having a magnitude that is a function of the rate of nuclear reaction between ions bombarding the target and said atomic nuclei included in the target and electrical means regulating the rate at which ions are supplied to the accelerator from the ion source in response to the magnitude of said signal, said electrical means controlling the rate at which material to be ionized is introduced into the ion source thereby regulating the rate at which ions are supplied to the accelerator from the ion source.

3. A source of penetrating radiation comprising an ion accelerator, a target positioned to be bombarded by ions accelerated by the accelerator, said target including atomic nuclei that undergo a nuclear reaction with bombarding ions to produce the penetrating radiation, an ion source for supplying ions to the accelerator, means for introducing a material to be ionized into the ion source at a controlled rate, and means for stabilizing the output of radiation so produced comprising radiation monitor means disposed adjacent the target for effecting an electrical signal having a magnitude that is a function of the rate of nuclear reaction between ions bombarding the target and said atomic nuclei included in the target and electrical means regulating the rate at which ions are supplied to the accelerator from the ion source in response to the magnitude of said signal, said electrical means controlling the rate at which material to be ionized is introduced into the ion source and comprising a servo system operatively coupled to the signal effecting means and the material introducing means to vary the rate of material introduction as an inverse function of the magnitude of the signal.

4. A stabilized source of neutrons comprising a D–T neutron source including an ion accelerator, a target positioned to be bombarded by ions accelerated by the accelerator, an ion source for supplying ions to the accelerator, and means for stabilizing the output of the D–T neutron source comprising monitor means sensitive substantially solely to alpha particles disposed adjacent the target for effecting an electrical signal having a magnitude that is a function of the rate at which alpha particles are produced in the target and electrical means regulating the rate at which ions are supplied to the accelerator from the ion source in response to the magnitude of said signal.

References Cited in the file of this patent

UNITED STATES PATENTS

| | | |
|---|---|---|
| 2,240,478 | Bischoff et al. | May 6, 1941 |
| 2,240,914 | Schutze | May 6, 1941 |
| 2,489,436 | Salisbury | Nov. 29, 1949 |
| 2,556,978 | Pierce | June 12, 1951 |
| 2,659,011 | Youmans et al. | Nov. 10, 1953 |
| 2,714,666 | Miller | Aug. 2, 1955 |
| 2,733,348 | Lawton et al. | Jan. 31, 1956 |
| 2,735,019 | Dewan et al. | Feb. 14, 1956 |
| 2,735,943 | Wright et al. | Feb. 21, 1956 |
| 2,769,096 | Frey | Oct. 30, 1956 |
| 2,817,032 | Batteau | Dec. 17, 1957 |
| 2,842,695 | Goodman | July 8, 1958 |
| 2,908,823 | Ely | Oct. 13, 1959 |
| 2,914,677 | Arnold | Nov. 24, 1959 |

FOREIGN PATENTS

| | | |
|---|---|---|
| 724,441 | Great Britain | Feb. 23, 1955 |